United States Patent
Yin et al.

(10) Patent No.: US 9,483,254 B2
(45) Date of Patent: Nov. 1, 2016

(54) METHOD, APPARATUS AND STORAGE MEDIUM FOR DYNAMICALLY PATCHING A FUNCTION

(71) Applicant: ZTE Corporation, Shenzhen (CN)

(72) Inventors: Feng Yin, Shenzhen (CN); Mingxing Zhu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/914,344

(22) PCT Filed: Jun. 16, 2014

(86) PCT No.: PCT/CN2014/080001
§ 371 (c)(1),
(2) Date: Feb. 25, 2016

(87) PCT Pub. No.: WO2015/027732
PCT Pub. Date: Mar. 5, 2015

(65) Prior Publication Data
US 2016/0210142 A1 Jul. 21, 2016

(30) Foreign Application Priority Data

Aug. 29, 2013 (CN) .......................... 2013 1 0385256

(51) Int. Cl.
*G06F 9/44* (2006.01)
*G06F 9/445* (2006.01)
*G06F 9/48* (2006.01)

(52) U.S. Cl.
CPC ............... *G06F 8/67* (2013.01); *G06F 9/4881* (2013.01)

(58) Field of Classification Search
CPC ........... G06F 8/65; G06F 8/67; G06F 9/4881
USPC .............................................. 717/168–173
See application file for complete search history.

(56) References Cited

U.S. PATENT DOCUMENTS 5,619,698 A * 4/1997 Lillich ...................... G06F 8/65
717/168

(Continued)

FOREIGN PATENT DOCUMENTS

| CN | 101004681 A | 7/2007 |
| CN | 101794272 A | 8/2010 |
| CN | 102722387 A | 10/2012 |

OTHER PUBLICATIONS

International Search Report in international application No. PCT/CN2014/080001, mailed on Sep. 19, 2014.

(Continued)

*Primary Examiner* — Qing Chen
(74) *Attorney, Agent, or Firm* — Oppedahl Patent Law Firm LLC (57) ABSTRACT

A method, apparatus and a storage medium for dynamically patching a function are provided. The method includes that: N long jump instructions at initial instructions of a modified patched function are restored to original instructions of the patched function according to a pre-tag of a currently running task, wherein N is an integer more than or equal to 3; and when the currently running task quits running, the N original instructions at the start of the initial instructions are modified into the long jump instructions in order to dynamically patch the function. By adopting the method, the N long jump instructions at the initial instructions of the modified patched function are restored as needed to the original instructions of the patched function during task running, and then, when the task quits running, the N original instructions at the start of the initial instructions are modified into the long jump instructions, so that replacement for the patched function is completed, dynamical patching for the function is realized, and the problem that a modified system may be unable to run normally after the initial instructions of the patched function are modified into the long jump instructions is solved.

15 Claims, 4 Drawing Sheets

(56) References Cited

U.S. PATENT DOCUMENTS

| | | | |
|---|---|---|---|
| 7,886,287 B1* | 2/2011 | Davda | G06F 8/67 711/200 |
| 2003/0101330 A1 | 5/2003 | Duesterwald | |
| 2004/0107416 A1* | 6/2004 | Buban | G06F 8/67 717/170 |
| 2012/0066484 A1* | 3/2012 | Yin | G06F 8/67 712/244 |
| 2012/0102476 A1* | 4/2012 | Yu | G06F 8/67 717/168 |

OTHER PUBLICATIONS

English Translation of the Written Opinion of the International Search Authority in international application No. PCT/CN2014/080001, mailed on Sep. 19, 2014.

Supplementary European Search Report in European application number: 14840123.5, mailed on Jul. 4, 2016.

\* cited by examiner

METHOD, APPARATUS AND STORAGE MEDIUM FOR DYNAMICALLY PATCHING A FUNCTION

TECHNICAL FIELD

The disclosure relates to the field of communications, and in particular to a method, apparatus and a storage medium for dynamically patching a function.

BACKGROUND

Software patches are, generally, independent software units which are issued in order to modify certain functions of an existing software system or correct certain faults of an existing software system. A dynamic software patch upgrading technology can complete repair for system functions or faults with no influence on normal running of the system, by which a currently running function in the existing system is replaced with a patching function generally, and therefore functions of the function are changed.

In an embedded system, although the dynamic patch upgrading technology has multiple implementation solutions, the technology mainly includes, to sum up, key steps as follows.

1, a patching function funcA is re-written and compiled in a background (a personal computer, generally), and a patch file fileB is generated;

2, the patch file fileB is downloaded into a foreground target machine;

3, an upgrading service module in the foreground target machine parses the patch file, and obtains addresses of the patching function funcA and a patched function funcC in a memory; and 4, initial instructions of the patched function funcC are modified into jump instructions, which jump to the patching function funcA.

Thus, when the function funcC is called, the initial instruction of the function funcC directly jumps to the function funcA for execution due to being a jump instruction, and then directly returns to a next instruction of the function funcC, thereby achieving the aim of replacing the function funcC with the function funcA.

If the relative address between the patching function funcA and the patched function funcC in the memory is small and within a short jump address range, dynamic patch upgrading can be realized by a short jump. However, with the gradual increase of a software scale, when sizes of a code segment and a data segment of a mapping file of a version exceed the short jump address range, and when a relative distance between the patching function and the patched function in the memory also exceeds the short jump address range, the dynamic patch upgrading cannot be realized by the short jump.

Long jump instructions in the traditional art may be completed by at least three instructions; if the initial instructions of a patched function are modified into long jump instructions, then the first three instructions of the initial instructions of the patched function are modified at least, and situations may occur as follows:

1, if a Program Counter (PC for short) pointer of a task A is just located at the second instruction or the third instruction at the start of the initial instructions of the patched function, then an unpredictable result is about to be caused when the task A is dispatched to run again; 2, if a PC pointer of a task B is located at the first instruction at the start of the initial instructions of the patched function, then the patching function can be normally executed when the task B is dispatched to run again; and 3, when a PC pointer of a task C is located at an unmodified instruction of the patched function, the patched function can be normally executed when the task C is dispatched to run again.

On the basis of the abovementioned process, it can be shown that there is no method capable of ensuring that a modified system runs normally in the traditional art after the initial instructions of the patched function are modified into long jump instructions.

SUMMARY

The embodiments of the disclosure provide a method and apparatus for dynamically patching a function, which are used to solve the problem that a modified system may be unable to run normally after the initial instructions of a patched function are modified into long jump instructions.

In order to solve the technical problem, on one hand, an embodiment of the disclosure provides a method for dynamically patching a function, which may include that: N long jump instructions at initial instructions of a modified patched function are restored to original instructions of the patched function according to a pre-tag of a currently running task, wherein N is an integer more than or equal to 3; and when the currently running task quits running, the N original instructions at the start of the initial instructions are modified into long jump instructions in order to dynamically patch the function.

Preferably, before the N long jump instructions at the initial instructions of the modified patched function are restored to the original instructions of the patched function according to the pre-tag of the currently running task, the method may further include that: all tasks in a system are traversed in order to determine to-be-modified tasks, wherein the to-be-modified tasks may be tasks of which PC pointers are located at N instructions at the initial instructions of the patched function, and positions of the N instructions may be used to record the long jump instructions of the modified patched function; and the to-be-modified tasks are tagged in order to determine types of all the current tasks.

Preferably, after the to-be-modified tasks are tagged, the method may further include that: under a condition that a task in all the tasks needs to run again, it is judged whether the task needing to run currently is tagged; and under a condition that the task needing to run currently is tagged, the N long jump instructions at the initial instructions of the patched function are restored to the original instructions of the patched function.

Preferably, the method may further include that: when the currently running task is about to quit running, it is judged whether the current task is a tagged task; under a condition that the current task is the tagged task, it is judged whether a PC pointer of the task is still located in a range of the N instructions at the initial instructions of the patched function; if the PC pointer is located in the range of the N instructions, the N original instructions at the initial instructions of the patched function are restored to the long jump instructions of the patched function; if the PC pointer is not located in the range of the N instructions, the tag of the current task which is about to quit running is eliminated, and then, the N original instructions at the initial instructions of the patched function are restored to the long jump instructions of the patched function; and under a condition that the current task is not the tagged task, it jumps to a task which is about to run.

Preferably, after all the running tasks in the system are traversed in order to determine the to-be-modified tasks, the method may further include that: the N original instructions at the initial instructions of the patched function are modified into the long jump instructions, and the original instructions are backed up.

On the other hand, an embodiment of the disclosure further provides an apparatus for dynamically patching a function, which may include: a restoration module, configured to restore N long jump instructions at initial instructions of a modified patched function to original instructions of the patched function according to a pre-tag of a currently running task, wherein N is an integer more than or equal to 3; and a first modification module, configured to modify, under a condition that the currently running task quits running, the N original instructions at the start of the initial instructions into long jump instructions in order to dynamically patch the function.

Preferably, the apparatus may further include: a determination module, configured to traverse all tasks in a system in order to determine to-be-modified tasks, wherein the to-be-modified tasks may be tasks of which PC pointers are located at N instructions at the initial instructions of the patched function, and positions of the N instructions may be used to record the long jump instructions of the modified patched function; and a tagging module, configured to tag the to-be-modified tasks in order to determine types of all the tasks.

Preferably, the apparatus may further include: a first judgment module, configured to judge, under a condition that a task in all the tasks needs to run again, whether the task needing to run currently is tagged; and the restoration module, further configured to restore, under a condition that the task needing to run currently is tagged, the N long jump instructions at the initial instructions of the patched function to the original instructions of the patched function.

Preferably, the apparatus may further include: a second judgement module, configured to judge, when the currently running task is about to quit running, whether the current task is a tagged task, and further configured to judge, under a condition that the current task is the tagged task, whether a PC pointer of the current task is still located in a range of the N instructions at the initial instructions of the patched function; the restoration module, further configured to restore, under a condition that the PC pointer is located in the range of the N instructions, the N original instructions at the initial instructions of the patched function to the long jump instructions of the patched function; the tagging module, further configured to eliminate, under a condition that the PC pointer is no longer located in the range of the N instructions, the tag of the current task which is about to quit running, and then trigger the restoration module to restore the N original instructions at the initial instructions of the patched function to the long jump instructions of the patched function; and a jump module, configured to jump to a task which is about to run under a condition that the current task is not the tagged task.

Preferably, the apparatus may further include: a second modification module, configured to modify the N original instructions at the initial instructions of the patched function into the long jump instructions, and back up the original instructions.

An embodiment of the disclosure further provides a storage medium. A computer program may be stored in the storage medium and may be configured to execute the method for dynamically patching a function.

According to the embodiments of the disclosure, N long jump instructions at the initial instructions of a modified patched function are restored to original instructions of the patched function, and then, when a current task quits running, the first N original instructions of the initial instructions are modified into long jump instructions, so that replacement for the patched function is completed, dynamical patching for the function is realized, and the problem that a modified system may be unable to run normally after the initial instructions of the patched function are modified into the long jump instructions is solved.

DETAILED DESCRIPTION

In order to solve the problem in the traditional art that a modified system may be unable to run normally after the initial instructions of a patched function are modified into long jump instructions, the disclosure provides a method and apparatus for dynamically patching a function. The disclosure is further described below with reference to the drawings and the embodiments in detail. It should be understood that the embodiments described herein are only intended to explain the disclosure, and do not limit the disclosure.

Figure 1:
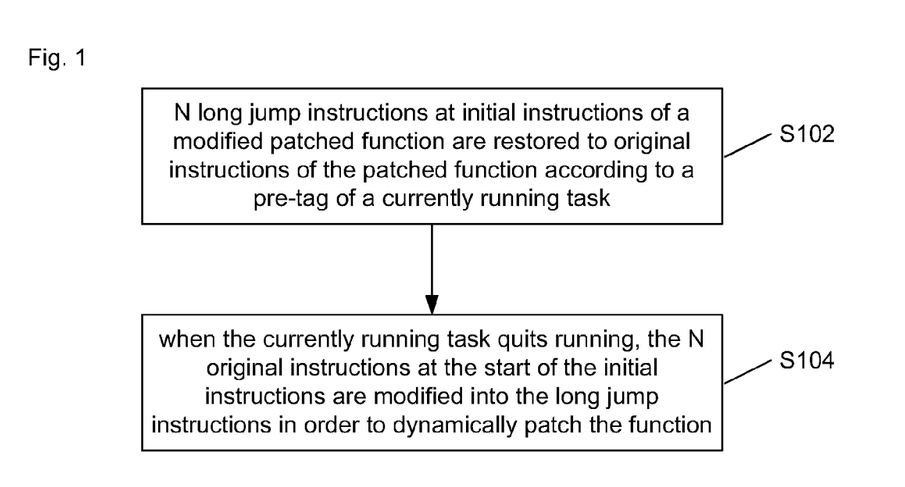
FIG. 1 is a flowchart of a method for dynamically patching a function according to an embodiment of the disclosure.

An embodiment of the disclosure provides a method for dynamically patching a function. FIG. 1 shows a flowchart of the method, which includes Step S102 to Step S104.

Step S102: N long jump instructions at initial instructions of a modified patched function are restored to original instructions of the patched function according to a pre-tag of a currently running task, wherein N is an integer more than or equal to 3.

During implementation, the value of N is determined according to the number of actual long jump instructions, and when the current task is called, the N long jump instructions at the initial instructions of the patched function are restored to the original instructions of the patched function, so that an original program can be executed as usual.

Step S104: when the currently running task quits running, the N original instructions at the start of the initial instructions are modified into long jump instructions in order to dynamically patch the function.

After the N original instructions at the start of the initial instructions are modified into long jump instructions again, replacement for the patched function is completed, dynamical patching for the function is realized, and the problem that the modified system may be unable to run normally after the initial instructions of the patched function are modified into long jump instructions is solved.

Before the N long jump instructions at the initial instructions of the modified patched function are restored to the original instructions of the patched function according to the pre-tag of the currently running task, all tasks in a system may be traversed first in order to determine which tasks are to-be-modified tasks, wherein the to-be-modified tasks are tasks of which PC pointers are located at N instructions at the initial instructions of the patched function; and after the to-be-modified tasks are determined, the to-be-modified tasks are tagged in order to facilitate identification of these tasks in a subsequent process. For example, the to-be-modified tasks are tagged as 1, so that in a subsequent implementation process, the to-be-modified tasks can be determined as long as tasks which are tagged as 1 are detected.

After all running tasks in the system are traversed in order to determine the to-be-modified tasks, the N original instructions at the initial instructions of the patched function can be directly modified into the long jump instructions, and the original instructions are backed up so as to complete modification of the patched function; a task switching hook function is then registered, the generated task switching hook function can be called by an operating system during task switching, the original instructions of the patched function are temporarily restored as needed by calling the task switching hook function, the task switching hook function is not described herein in detail, and those skilled in the art can design the function according to contents disclosed by the embodiment.

In an implementation process, under the condition that a task in all the tasks needs to run again, it is judged whether the task needing to run currently is tagged. Under the condition that the task needing to run currently is tagged, the N long jump instructions at the initial instructions of the patched function are restored to the original instructions of the patched function. If the task needing to run currently is not tagged, a program runs normally.

When the currently running task is about to quit running, it is judged whether the current task is a tagged task; under the condition that the current task is the tagged task, it is judged whether a PC pointer of the task is still located in a range of the N instructions at the initial instructions of the patched function; if the PC pointer is located in the range of the N instructions, which indicates that a problem may be still caused when the task runs again, then the N original instructions at the initial instructions of the patched function are restored to the long jump instructions of the patched function; if the PC pointer is not located in the range of the N instructions, which indicates that a problem will not be caused when the task runs again, then the tag of the current task which is about to quit running is eliminated, and then, the N original instructions at the initial instructions of the patched function are restored to the long jump instructions of the patched function; and under the condition that the current task is not the tagged task, it jumps to a task which is about to run.

Figure 2:
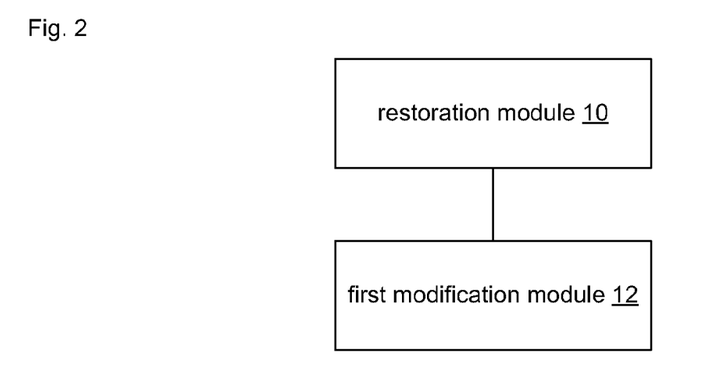
FIG. 2 is a first structural diagram of an apparatus for dynamically patching a function according to an embodiment of the disclosure.

An embodiment of the disclosure further provides an apparatus for dynamically patching a function. FIG. 2 shows a structural diagram of the apparatus, which includes: a restoration module 10, configured to restore N long jump instructions at initial instructions of a modified patched function to original instructions of the patched function according to a pre-tag of a currently running task, wherein N is an integer more than or equal to 3; and a first modification module 12, coupled to the restoration module 10, and configured to modify, under the condition that the currently running task quits running, the first N original instructions of the initial instructions into the long jump instructions in order to dynamically patch the function.

Figure 3:
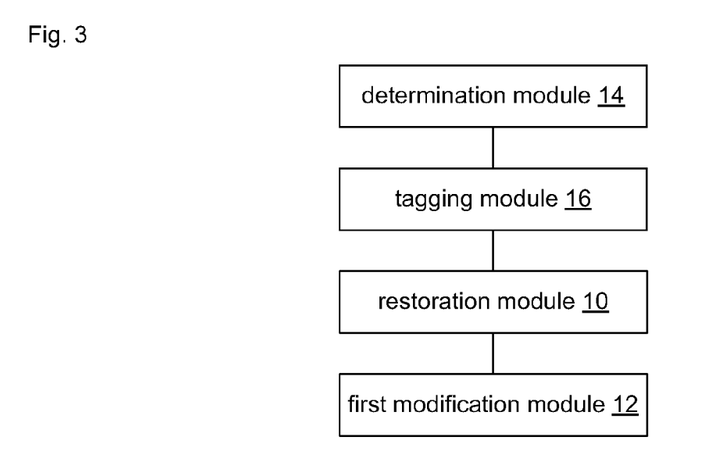
FIG. 3 is a second structural diagram of an apparatus for dynamically patching a function according to an embodiment of the disclosure.

FIG. 3 shows a preferred structure of the apparatus. On the basis of FIG. 2, the apparatus further includes: a determination module 14, configured to traverse all tasks in a system in order to determine to-be-modified tasks, wherein the to-be-modified tasks are tasks of which PC pointers are located at N instructions at the initial instructions of the patched function, and positions of the N instructions are configured to record the long jump instructions of the modified patched function; and a tagging module 16, coupled to the determination module 14 and the restoration module 10, and configured to tag the to-be-modified tasks in order to determine types of all the current tasks.

Figure 4:
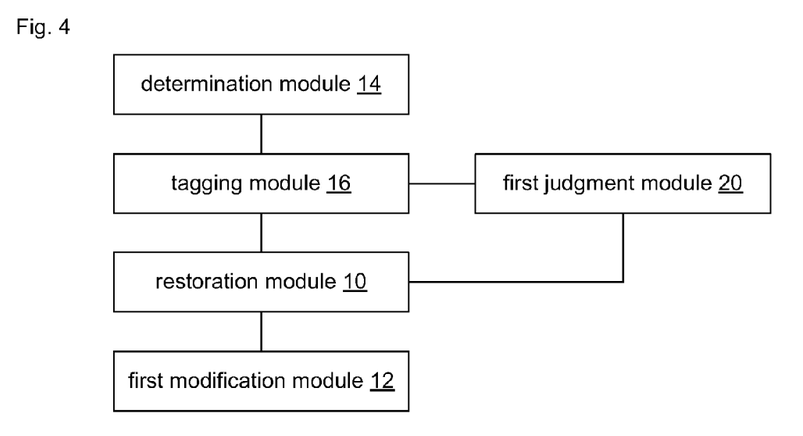
FIG. 4 is a third structural diagram of an apparatus for dynamically patching a function according to an embodiment of the disclosure.

FIG. 4 shows another preferred structure of the apparatus. On the basis of FIG. 3, the apparatus further includes: a first judgment module 20, configured to judge, under the condition that a task in all the tasks needs to run again, whether the task needing to run currently is tagged; and the restoration module 10, coupled to the first judgment module 20, and further configured to restore, under the condition that the task needing to run currently is tagged, the N long jump instructions at the initial instructions of the patched function to the original instructions of the patched function.

Figure 5:
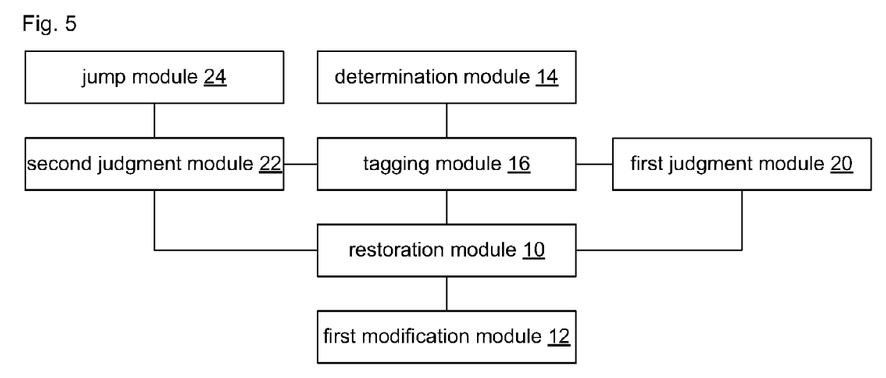
FIG. 5 is a fourth structural diagram of an apparatus for dynamically patching a function according to an embodiment of the disclosure.

FIG. 5 shows another preferred structure of the apparatus. On the basis of FIG. 4, the apparatus further includes: a second judgement module 22, coupled to the tagging module 16 and the restoration module 10, and configured to judge, when the currently running task is about to quit running, whether the current task is a tagged task, and further configured to judge, under the condition that the current task is the tagged task, whether a PC pointer of the task is still located in a range of the N instructions at the initial instructions of the patched function; the restoration module 10, further configured to restore, under the condition that the PC pointer is located in the range of the N instructions, the N original instructions at the initial instructions of the patched function to the long jump instructions of the patched function; the tagging module 16, further configured to eliminate, under the condition that the PC pointer is no longer located in the range of the N instructions, the tag of the current task which is about to quit running, and then trigger the restoration module to restore the N original instructions at the initial instructions of the patched function to the long jump instructions of the patched function; and a jump module 24, coupled to the second judgment module 22, and configured to jump to a task which is about to run under the condition that the current task is not the tagged task.

Figure 6:
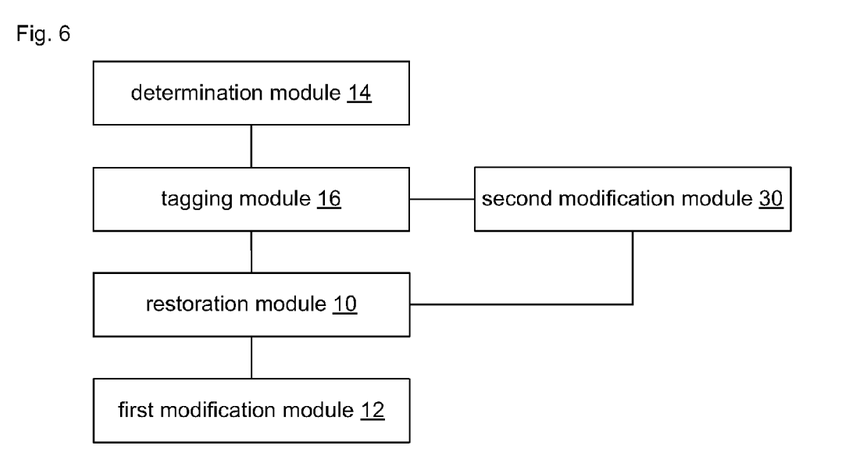
FIG. 6 is a fifth structural diagram of an apparatus for dynamically patching a function according to an embodiment of the disclosure.

FIG. 6 shows another preferred structure of the apparatus. On the basis of FIG. 3, the apparatus further includes: a second modification module 30, coupled to the tagging module 16 and the restoration module 10, and configured to modify the N original instructions at the initial instructions of the patched function into the long jump instructions, and back up the original instructions.

Those skilled in the art should understand that all processing modules can be realized by an Application Processor (AP), a Central Processing Unit (CPU), a Digital Signal Processor (DSP) or a Field Programmable Gate Array (FPGA) and so on.

Preferred Embodiments

From the traditional art, it can be seen that when long jump instructions are used, it is only needed to avoid the situation that PC pointers are located in the range of N instructions at the initial instructions of a patched function. An embodiment of the disclosure provides a method for dynamically patching a function, wherein there are three long jump instructions. According to the method, when task A is dispatched to run again under the first condition, the three long jump instructions at the initial instructions of a modified patched function are temporarily restored to original instructions of the patched function, and when the task A quits dispatching, three instructions at the start of the initial instructions of the patched function are then modified into long jump instructions. The method can be applied to dynamic patch upgrading in an embedded system, particularly to a situation that the relative address between the patching function and the patched function exceed the short jump address range.

Figure 7:
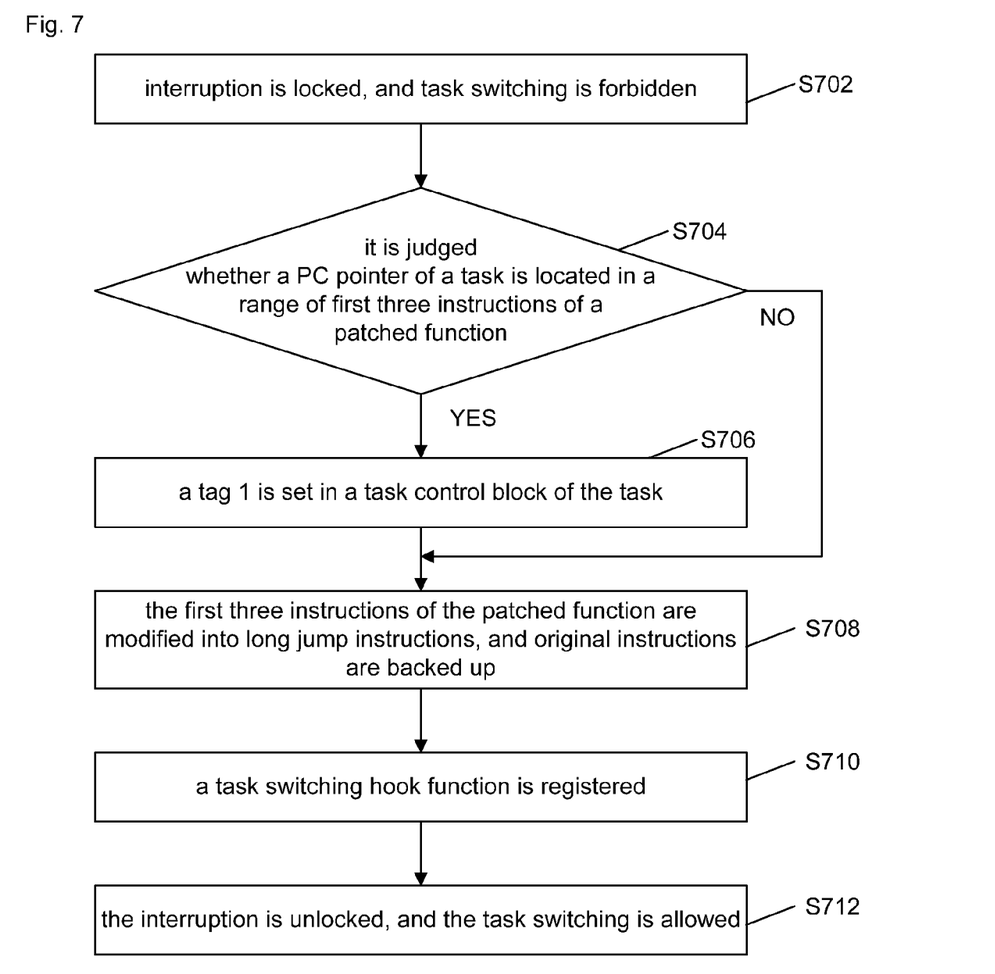
FIG. 7 is a flowchart of initialization for dynamically patching a function according to a preferred embodiment of the disclosure.

During the dynamic patch upgrading, FIG. 7 shows an initialization flow, which includes specific steps (Step S702 to Step S712) as follows.

Step S702: interruption is locked, and task switching is forbidden.

Step S704: all running tasks in a system are traversed, and it is judged whether a PC pointer of a task is located in a range of the first three instructions of a patched function. If the PC pointer is located in the range of the first three instructions, Step S706 is executed, and if the PC pointer is not located in the range of the first three instructions, Step S708 is executed.

Step S706: a tag 1 is set in a task control block of the task of which the PC pointer is located at the three instructions of initial instructions of the patched function. The tag 1 is used to identify that initial long jump instructions of the patched function need to be restored to original instructions during running after the task is dispatched.

Step S708: the first three instructions of the initial instructions of the patched function are modified into the long jump instructions, and the original instructions are backed up.

Step S710: a task switching hook function is registered, so that during the task switching, the system is about to call the hook function.

Step S712: the interruption is unlocked, and the task switching is allowed.

A currently running task in the system is tagged in the above process, and tasks in which long jump instructions need to be restored to the original instructions can be more conveniently distinguished by tagging.

Figure 8:
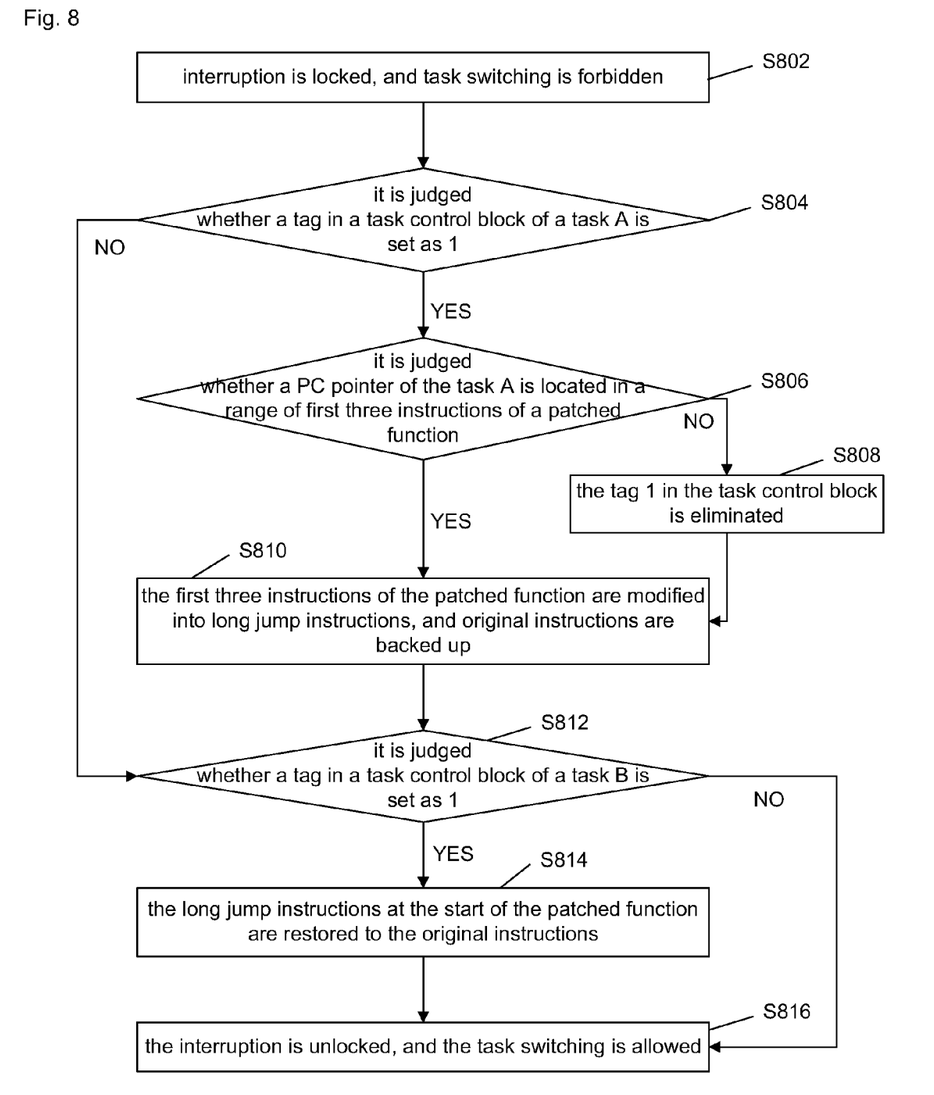
FIG. 8 is a flowchart of hook function processing for switching a task A to a task B according to a preferred embodiment of the disclosure.

When the task switching, for example, switching from a currently running task A to a task B which is about to run, occurs, FIG. 8 shows a specific implementation flow of the task switching hook function, which includes steps (Step S802 to Step S816) as follows.

Step S802: interruption is locked, and task switching is forbidden.

Step S804: it is judged whether there is a tag 1 in a task control block of the task A. If there is the tag 1, then it indicates that three instructions at initial instructions of a patched function need to be restored to original instructions when the task A runs in an early stage, and Step S806 is executed. If there is no tag 1, then it is shown that instructions at the initial instructions of the patched function are long jump instructions, and Step S812 is executed.

Step S806: it is judged whether a PC pointer of the task A is still located in a range of three instructions at the initial instructions of the patched function. If the PC pointer is located in the range of the three instructions, then it is shown that the initial instructions of the patched function still need to be restored to the original instructions of the patched function when the task A runs again later, and Step S810 is executed. If the PC pointer is not located in the range of the three instructions, then it is shown that the initial instructions of the patched function do not need to be restored to the original instructions of the patched function when the task A is dispatched to run again, and Step S808 is executed.

Step S808: the tag 1 in the task control block of the task A is eliminated at this moment.

Step S810: the three instructions at the initial instructions of the patched function are modified into the long jump instructions, and the original instructions are backed up. Thus, a process of ending running of the task A is finished, and then there comes a flow to run the task B.

Step S812: it is judged whether there is a tag 1 in a task control block of the task B. If there is the tag 1, it is shown that the task B is a to-be-modified task, and Step S814 is executed. If there is no tag 1, Step S816 is executed.

Step S814: the long jump instructions at the initial instructions of the patched function are restored to the original instructions.

Step S816: the interruption is unlocked, and the task switching is allowed.

An embodiment of the disclosure further provides a storage medium. A computer program is stored in the storage medium and is configured to execute the method for dynamically patching a function according to the above embodiment.

The preferred embodiments of the disclosure have been disclosed for an example purpose. Those skilled in the art may realize that various modifications, additions and replacements are possible. Thus, the scope of the disclosure should not be limited to the abovementioned embodiments.

INDUSTRIAL APPLICABILITY

According to the disclosure, N long jump instructions at the initial instructions of a modified patched function are restored to original instructions of the patched function, and then, when a current task quits running, the first N original instructions of the initial instructions are modified into long jump instructions, so that replacement for the patched function is completed, dynamical patching for the function is realized, and the problem that the modified system may be unable to run normally after the initial instructions of the patched function are modified into the long jump instructions is solved.

What is claimed is:

1. A method for dynamically patching a function, comprising:
restoring, by a processor, N long jump instructions at initial instructions of a modified patched function to original instructions of the modified patched function according to a pre-tag of a currently running task, wherein N is an integer more than or equal to 3;
modifying, by the processor, under a condition that the currently running task quits running, N original instructions at the start of the initial instructions into long jump instructions; and in response to modifying, by the processor, under the condition that the currently running task quits running, the N original instructions at the start of the initial instructions into the long jump instructions, dynamically patching, by the processor, the function.

2. The method according to claim 1, wherein, before the N long jump instructions at the initial instructions of the modified patched function are restored to the original instructions of the modified patched function according to the pre-tag of the currently running task, the method further comprising:
   traversing all tasks in a system in order to determine to-be-modified tasks, wherein the to-be-modified tasks are tasks of which Program Counter (PC) pointers are located at N instructions at the initial instructions of the modified patched function, and positions of the N instructions are used to record the long jump instructions of the modified patched function;
   tagging the to-be-modified tasks; and
   in response to tagging the to-be-modified tasks, determining types of all the tasks.

3. The method according to claim 2, wherein, after the to-be-modified tasks are tagged, the method further comprising:
   judging, under a condition that a task in all the tasks needs to run again, whether the task in all the tasks needing to run currently is tagged; and
   restoring, under a condition that the task in all the tasks needing to run currently is tagged, the N long jump instructions at the initial instructions of the modified patched function to the original instructions of the modified patched function.

4. The method according to claim 3, further comprising:
   judging, when the currently running task is going to quit running, whether the currently running task is a tagged task;
   judging, under a condition that the currently running task is the tagged task, whether a PC pointer of the currently running task is still located in a range of the N instructions at the initial instructions of the modified patched function;
   if the PC pointer of the currently running task is located in the range of the N instructions, restoring the N original instructions at the initial instructions of the modified patched function to the long jump instructions of the modified patched function;
   if the PC pointer of the currently running task is not located in the range of the N instructions, eliminating the tag of the currently running task which is going to quit running, and then, restoring the N original instructions at the initial instructions of the modified patched function to the long jump instructions of the modified patched function; and
   jumping to a task which is going to run under a condition that the currently running task is not the tagged task.

5. The method according to claim 2, wherein, after all the tasks in the system are traversed in order to determine the to-be-modified tasks, the method further comprising:
   modifying the N original instructions at the initial instructions of the modified patched function into the long jump instructions; and
   backing up the original instructions of the modified patched function.

6. An apparatus for dynamically patching a function, comprising:
   a processor;
   a restoration module configured to restore N long jump instructions at initial instructions of a modified patched function to original instructions of the modified patched function according to a pre-tag of a currently running task, wherein N is an integer more than or equal to 3; and
   a first modification module configured to:
      modify, under a condition that the currently running task quits running, N original instructions at the start of the initial instructions into long jump instructions; and
      in response to modifying, under the condition that the currently running task quits running, the N original instructions at the start of the initial instructions into the long jump instructions, dynamically patch the function.

7. The apparatus according to claim 6, wherein, before the N long jump instructions at the initial instructions of the modified patched function are restored to the original instructions of the modified patched function according to the pre-tag of the currently running task, the apparatus further comprising:
   a determination module configured to traverse all tasks in a system in order to determine to-be-modified tasks, wherein the to-be-modified tasks are tasks of which Program Counter (PC) pointers are located at N instructions at the initial instructions of the modified patched function, and positions of the N instructions are used to record the long jump instructions of the modified patched function; and
   a tagging module configured to:
      tag the to-be-modified tasks; and
      in response to tagging the to-be-modified tasks, determine types of all the tasks.

8. The apparatus according to claim 7, wherein, after the to-be-modified tasks are tagged, the apparatus further comprising:
   a first judgement module configured to judge, under a condition that a task in all the tasks needs to run again, whether the task in all the tasks needing to run currently is tagged; and
   the restoration module further configured to restore, under a condition that the task in all the tasks needing to run currently is tagged, the N long jump instructions at the initial instructions of the modified patched function to the original instructions of the modified patched function.

9. The apparatus according to claim 8, further comprising:
   a second judgment module configured to judge, when the currently running task is going to quit running, whether the currently running task is a tagged task, and further configured to judge, under a condition that the currently running task is the tagged task, whether a PC pointer of the currently running task is still located in a range of the N instructions at the initial instructions of the modified patched function;
   the restoration module further configured to restore, if the PC pointer of the currently running task is located in the range of the N instructions, the N original instructions at the initial instructions of the modified patched function to the long jump instructions of the modified patched function;
   the tagging module further configured to eliminate, if the PC pointer of the currently running task is not located in the range of the N instructions, the tag of the currently running task which is going to quit running, and then, trigger the restoration module to restore the N original instructions at the initial instructions of the modified patched function to the long jump instructions of the modified patched function; and
   a jump module configured to jump to a task which is going to run under a condition that the currently running task is not the tagged task.

10. The apparatus according to claim 7, wherein, after all the tasks in the system are traversed in order to determine the to-be-modified tasks, the apparatus further comprising:
  a second modification module configured to:
    modify the N original instructions at the initial instructions of the modified patched function into the long jump instructions; and
    back up the original instructions of the modified patched function.

11. A non-transitory computer-readable storage medium storing a computer program configured to execute a method for dynamically patching a function, wherein the method comprises:
  restoring N long jump instructions at initial instructions of a modified patched function to original instructions of the modified patched function according to a pre-tag of a currently running task, wherein N is an integer more than or equal to 3;
  modifying, under a condition that the currently running task quits running, N original instructions at the start of the initial instructions into long jump instructions; and
  in response to modifying, under the condition that the currently running task quits running, the N original instructions at the start of the initial instructions into the long jump instructions, dynamically patching the function.

12. The non-transitory computer-readable storage medium according to claim 11, wherein, before the N long jump instructions at the initial instructions of the modified patched function are restored to the original instructions of the modified patched function according to the pre-tag of the currently running task, the computer program is configured to execute the method further comprising:
  traversing all tasks in a system in order to determine to-be-modified tasks, wherein the to-be-modified tasks are tasks of which Program Counter (PC) pointers are located at N instructions at the initial instructions of the modified patched function, and positions of the N instructions are used to record the long jump instructions of the modified patched function;
  tagging the to-be-modified tasks; and
  in response to tagging the to-be-modified tasks, determining types of all the tasks.

13. The non-transitory computer-readable storage medium according to claim 12, wherein, after the to-be-modified tasks are tagged, the computer program is configured to execute the method further comprising:
  judging, under a condition that a task in all the tasks needs to run again, whether the task in all the tasks needing to run currently is tagged; and
  restoring, under a condition that the task in all the tasks needing to run currently is tagged, the N long jump instructions at the initial instructions of the modified patched function to the original instructions of the modified patched function.

14. The non-transitory computer-readable storage medium according to claim 13, wherein the computer program is configured to execute the method further comprising:
  judging, when the currently running task is going to quit running, whether the currently running task is a tagged task;
  judging, under a condition that the currently running task is the tagged task, whether a PC pointer of the currently running task is still located in a range of the N instructions at the initial instructions of the modified patched function;
  if the PC pointer of the currently running task is located in the range of the N instructions, restoring the N original instructions at the initial instructions of the modified patched function to the long jump instructions of the modified patched function;
  if the PC pointer of the currently running task is not located in the range of the N instructions, eliminating the tag of the currently running task which is going to quit running, and then, restoring the N original instructions at the initial instructions of the modified patched function to the long jump instructions of the modified patched function; and
  jumping to a task which is going to run under a condition that the currently running task is not the tagged task.

15. The non-transitory computer-readable storage medium according to claim 12, wherein, after all the tasks in the system are traversed in order to determine the to-be-modified tasks, the computer program is configured to execute the method further comprising:
  modifying the N original instructions at the initial instructions of the modified patched function into the long jump instructions; and
  backing up the original instructions of the modified patched function.

* * * * *